US005535952A

United States Patent [19]

Tada

[11] Patent Number: 5,535,952

[45] Date of Patent: Jul. 16, 1996

[54] SAFETY MECHANISM FOR A MANUALLY OPERATED TRIGGER ACTIVATED DISPENSER

[76] Inventor: Tetsuya Tada, 2-6-3 Kakinokizaka, Meguro-ku, Tokyo, Japan

[21] Appl. No.: 285,915

[22] Filed: Aug. 4, 1994

[30] Foreign Application Priority Data

Aug. 11, 1993 [JP] Japan .................................... 5-047734

[51] Int. Cl.$^6$ .................................................... F16K 35/00

[52] U.S. Cl. ........................ 239/333; 239/394; 239/581.1; 222/153.01

[58] Field of Search .................................... 239/333, 330, 239/393, 394, 396, 395, 600, 581.1; 222/153.01; 251/114, 107; 24/588, 599.1, 609, 604, 647, 648

[56] References Cited

U.S. PATENT DOCUMENTS

| | | | |
|---|---|---|---|
| 1,167,712 | 1/1916 | Paine | 251/114 |
| 1,554,521 | 9/1925 | Reece | 239/394 |
| 1,903,442 | 4/1933 | Chamberlain | 222/153.01 |
| 2,101,585 | 12/1932 | La Vigne | 24/588 X |
| 2,198,639 | 4/1940 | Stines | 251/114 X |
| 3,212,718 | 10/1965 | Green | 239/394 |
| 3,258,172 | 6/1966 | Litman | 222/153.01 |
| 3,927,834 | 12/1975 | Tada . | |
| 4,558,821 | 12/1985 | Tada et al. . | |
| 5,088,628 | 2/1992 | Knickerbocker . | |
| 5,228,600 | 7/1993 | Steijns . | |

FOREIGN PATENT DOCUMENTS

| | | | |
|---|---|---|---|
| 262362 | 10/1947 | France | 239/588 |
| 54-35681 | 11/1979 | Japan . | |
| 6821 | 1/1896 | Sweden | 239/394 |

*Primary Examiner*—Kevin P. Weldon
*Attorney, Agent, or Firm*—Frishauf, Holtz, Goodman, Langer & Chick

[57] ABSTRACT

A safety mechanism for a trigger activated dispenser which dispenses a pressurized fluid includes an engaging piece connected to an upper surface of a dispenser body by a hinge. The engaging piece, the dispenser body and the hinge are molded integrally from a plastic material and an engaging groove is formed on an upper surface of a nozzle cap to receive the engaging piece when the nozzle cap is rotated to an "Off" position. When the engaging piece is received in the engaging groove in the nozzle cap, the nozzle cap is locked in the "Off" state and the nozzle cap is prevented from being rotated to any position at which liquid can flow.

4 Claims, 3 Drawing Sheets

SAFETY MECHANISM FOR A MANUALLY OPERATED TRIGGER ACTIVATED DISPENSER

BACKGROUND OF THE INVENTION

1. Field of the Invention

The present invention relates to a manually operated trigger type dispenser which is connected to the mouth of a container and sucks liquid from the container into a cylinder, compresses it and causes it to flow out by reciprocation of a piston in cooperation with a trigger.

2. Description of the Prior Art

The problem of destroying the ozone layer is now a great problem. Hence, dispensers which use no freon gas to pressurize liquid and which is rather manually operated to pressurize and force out liquid, are drawing more and more attention. In the dispenser of this kind, a dispenser body is connected by a bottle cap, for example, to the mouth of a container which holds liquid to be dispensed and cylinder is integrally formed on the dispenser body, for example.

A trigger pivotally connected to the dispenser, for example, and a piston reciprocates in the cylinder in cooperation with traction of the trigger against urging force of a return spring. When the piston is returned from the pushed-in position to the initial position, the interior of the cylinder is negatively pressurized. Then, a primary valve is opened and a secondary valve is closed. When the trigger is released, it is returned to its initial position by the urging force of the return spring and the piston is also returned to its inital position in cooperation with the trigger. Under the negative pressure in the cylinder, the liquid is sucked from the container into the cylinder through a suction tube and the primary valve as the liquid excludes residual air in the cylinder. Upon pulling the trigger against the return spring, the piston is pushed into the cylinder to pressurize the liquid in the cylinder. The pressurized liquid opens the secondary valve and flows out of the cylinder.

The liquid pressurized by the pump action of the piston in cooperation with the trigger flows into the flowing-out passage through the cylinder and the secondary valve. A blind-ended nozzle cap formed separately from the dispenser body is conncted to the front end of the dispenser body and a spinner (or a swirling member) is housed in the nozzle cap. The pressurized liquid is swirled by the spinner and flow-out of an orifice (or a flow-out port) formed on the front surface of the nozzle cap.

In the dispenser of this kind, the nozzle cap is threadably connected to the flowing-out passage of the dispenser body, and the state of liquid flow or a liquid flow pattern is changed by adjusting the distance between the spinner and the orifice by rotation the nozzle cap. When, however, the nozzle cap is rotated excessively in the dispenser having this structure, the nozzle cap may be disengaged from the dispenser body and may be lost. Further, since the liquid flow patterns continuously change, it is difficult to show the relation between the liquid flow patterns and the angles of rotation clearly.

In order to solve this problem, there has been proposed a manually operated trigger type dispenser which includes a spinner assembly fixed to the front end of the flowing-out passage of a dispenser body and a plurality of liquid flow controlling portions is formed in the spinner assembly and a nozzle cap is not threadably connected to the spinner assembly but is merely rotatably provided on it. For example, four liquid flow controlling portions are provided in the spinner assembly, for example, as disclosed in Japanese Examined Patent Application Publication No. 54-035681. Four marks, "High-Spray" at which completely sprayed flow is produced, "Low-Spray" at which not completely sprayed flow is produced, "Jet-Stream" at which not swirled, straight jet stream is produced and "Off" at which the orifice of the nozzle is disconnected from the flowing-out passage of the dispenser body are indicated on the nozzle cap at angular intervales of 90°. When the mark corresponding to the required liquid flow pattern is shown on the upper surface of the nozzle cap by rotating it, the pressurized liquid flows out in the required flow pattern. At the "Off" mark, the nozzle is set to the not flowing-out position.

Since the nozzle cap is not threadably connected although it is rotatably provided in this structure, the nozzle cap is neither disengaged nor lost. The flow patterns are changed every time the nozzle cap is rotated through 90°. Thus, the change-over of the flow patterns is ensured and the flow patterns can be noticed clearly at a glance of the mark showing the corresponding flow pattern.

When the use of the manually operated trigger type dispenser is interrupted, the liquid is sucked up into the cylinder, fills it and is retained in it. When the trigger is pulled again, even a child such as a baby can pull the trigger because the traction force of the trigger is not set to a large value. If the dispenser is put carelessly at a position which the child is accessible, the child may rotate the nozzle cap to cause the orifice to communicate with the flow-out passage and then may pull the trigger by mistake. The liquid which has flowed out may enter an eye or eyes of the child or may adhere to his or her skin, and an unexpected trouble may occur.

A manually operated trigger type dispenser is provided with a accident preventing safety mechanism called a child proof mechanism in order to prevent the trouble of this kind. In general, as child proof mechanisms are classified into two types, one which a holing piece of a trigger is provided on a dispenser body and engages an engaging hole formed in the trigger so as to forcibly prevent swinging of the trigger (for example, as disclosed in the U.S. Pat. Nos. 4,558,821 (Tada) and 3,927,834 (Tada). In the child proof mechanism of a trigger lock type, the holding piece is relatively large. When the dispenser is in use, the holding piece is not fixed but is released, and hinders traction of the trigger adversely. Further, the relatively large holding piece gives strange impression and deteriorates its appearance.

SUMMARY OF THE INVENTION

It is therefore an object of the present invention to provide a manually operated trigger type dispenser without hindering traction of a trigger during its usage and without deteriorating the appearance.

In order to achieve this object, the present invention provides means for locking a nozzle cap at a not using position. In other words, an engaging piece is connected to the upper surface of a dispenser body by a hinge, and the engaging piece, the dispenser body and the hinge are molded integrally from a plastics material. When a liquid controlling portion which disconnects the orifice of a nozzle cap from the flowing-out passege in the dispenser body is selected, an engaging groove with which the engaging piece is engaged is provided in the nozzle cap.

In this structure, the engaging piece is engaged with the engaging groove in the nozzle cap and the nozzle cap is prevented from rotating in a so-called "Off" state. Thus, even if a child happens to pull the trigger of the dispenser, the liquid does not flow out and no trouble occurs, as long as the engaging piece is engaged with the engaging groove in the nozzle cap.

DETAILED DESCRIPTION OF THE PREFERRED EMBODIMENTS

An embodiment according to the present invention will be described with reference to the accompanying drawings.

Figure 1:
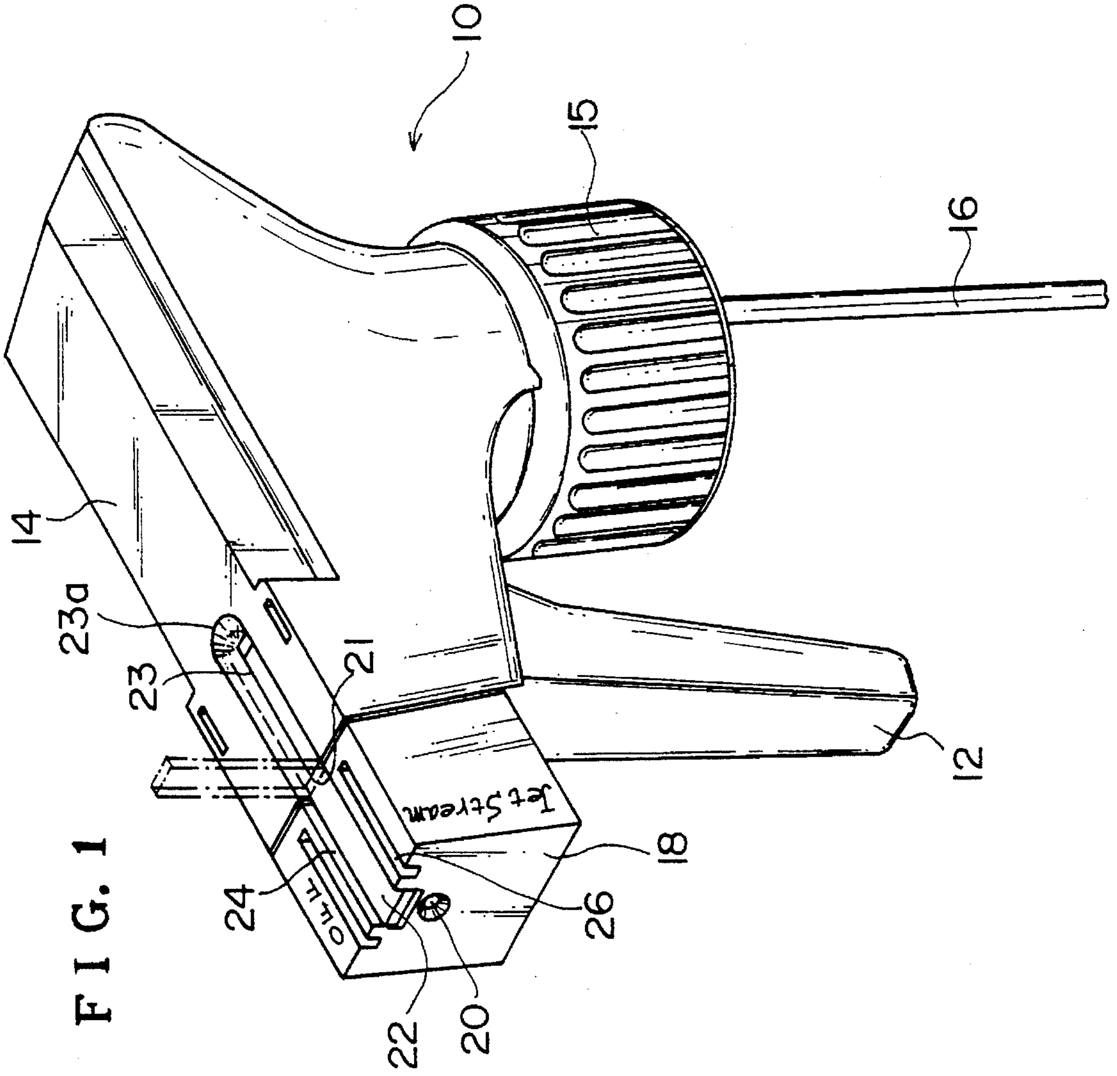
FIG. 1 is a perspective view of a manually operated trigger type dispenser according to one embodiment of the present invention with a nozzle cap locked at an "Off" position.

As shown in FIG. 1, a manually operated trigger type dispenser 10 according to the present invention is provided with a trigger 12 pivotally fitted in a lateral wall of a dispenser body 14, for example, and held at the initial position by a urging force of return spring (not shown).

A piston is connected to the trigger 12 so as to cooperate therewith. The piston reciprocates in response to the swing of the trigger 12 to perform a pumping action. The dispenser body 14 is threadably engaged with the mouth of a container by means of a bottle cap 15, for example. As the piston reciprocates in the cylinder, liquid is sucked up from the container into the cylinder through a suction tube 16 and a primary valve, and the liquid is compressed. Then, the pressurized liquid flows out of the cylinder through a secondary valve and flow in a flowing-out passage formed in the dispenser body 14. A spinner assembly is fixed to the front end of the flowing-out passege in the dispenser body 14 and a nozzle cap 18 is rotatably mounted on the spinner assembly.

Four different liquid flow controlling portions are formed in the spinner assembly. Since the structure of the spinner assembly is not the gist of the the present invention, the spinner assembly is not described in detail in this specification. The spinner assembly provides the following four liquid flow controlling portions;

(1) a first controlling portion which produces a fine spray flow formed by fully swirling the pressurized liquid;

(2) a second controlling portion which produces a not fine spray;

(3) a third controlling portion which produces a jet stream without swirling the pressurized liquid; and (4) a fourth controlling portion which disconnects an orifice (or an flowing-out port) 20 formed in the front surface of the nozzle cap 18 from the flowing-out passage formed in the dispenser body 14.

The nozzle cap 18 is generally rectanglar in cross-section. An elastic inner tube having a notch is molded from plastics material integrally with the nozzle cap 18 and fitted in the spinner assembly so that the nozzle cap 18 is rotatably and immovably connected to the spinner assembly.

The structure of the spinner assembly and the means of connecting the nozzle cap 18 to the spinner assembly may be the same as those disclosed in the Japanese Examined Patent Application Publication No. 54-035681, for example.

In this structure, the following concrete liquid flows and the states are obtained by rotating the nozzle cap 18 through 90° in turn:

(1) fine spray (high-spray);

(2) rough spray including relatively large bubbles (low-spray);

(3) a jet stream which is not swirled (a jet-stream); and (4) an "Off" state in which no pressurized liquid flow (a not using state).

The number of liquid flow patterns is not limited to four but can be varied by changing the number of liquid flow controlling portions.

Figure 2:
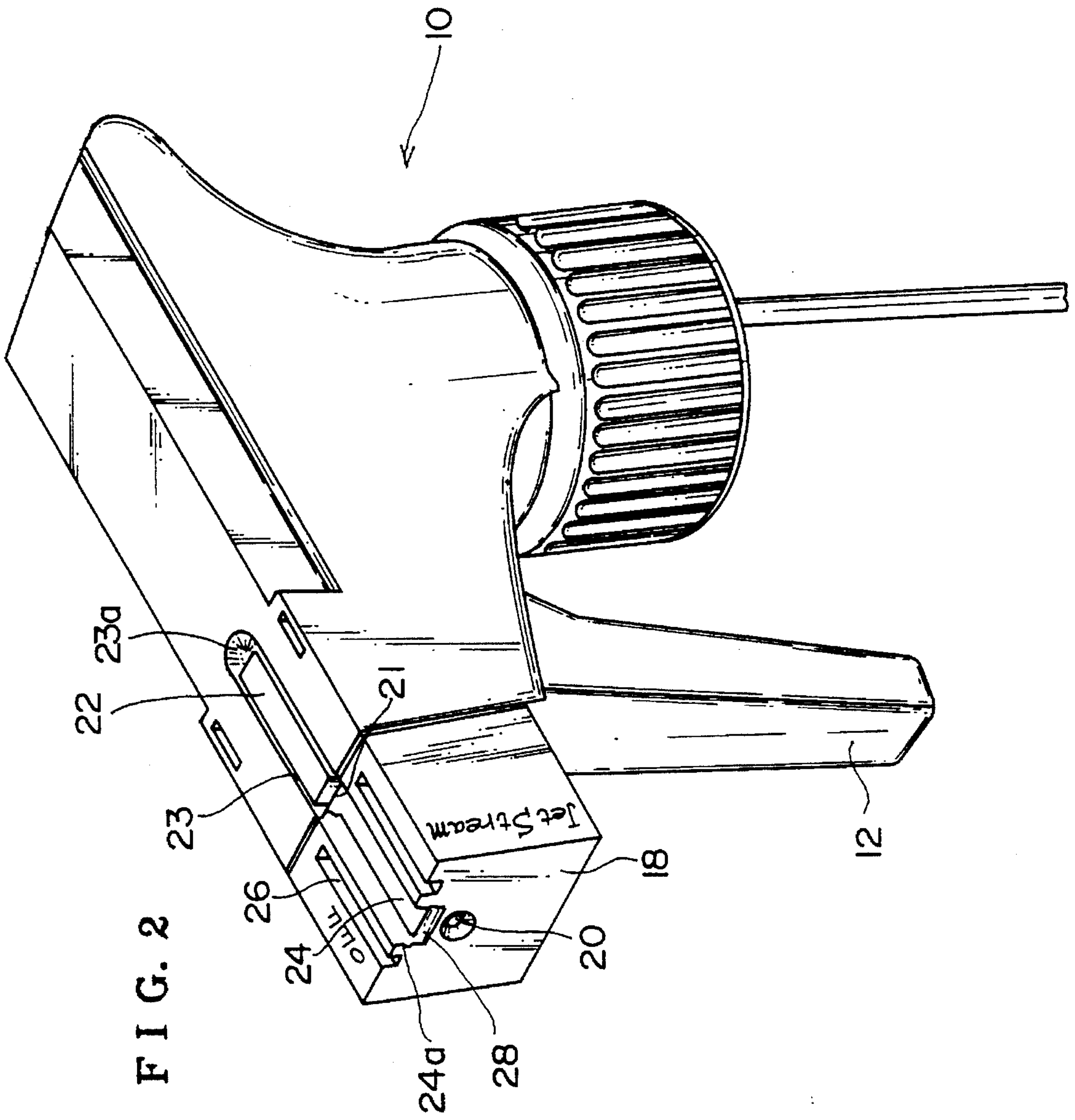
FIG. 2 is a perspective view of the dispenser with the nozzle cap unlocked.

As understood from FIG. 2 in addition to FIG. 1, an engaging piece 22 is connected to the upper surface of the dispenser body 14 by means of a hinge 21, and the engaging piece 22, the dispenser body 14 and the hinge 21 are molded integrally from a plastics material. The engaging piece 22 can be put in an engaging groove 23 formed in the upper surface of the dispenser body 14 as a molding trace of the engaging piece 22.

Figure 3:
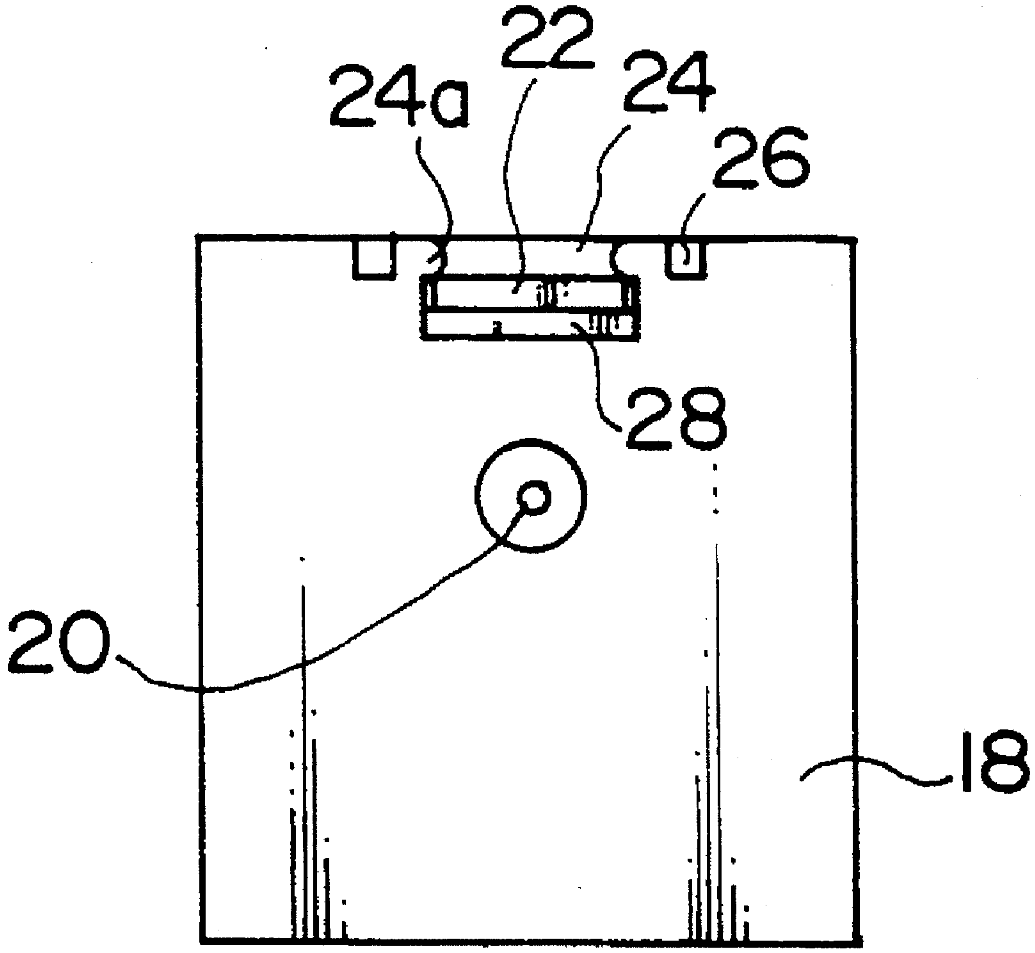
FIG. 3 is an enlarged front view of the nozzle cap locked at the "Off" position.

An engaging groove 24 are formed in the nozzle cap 18 so as to receive the engaging piece 22 when the nozzle cap 18 is rotated to the "Off" position. It is preferred that the engaging grooves 23 and 24 have such a shape that they can securely receive the engaging piece 22 and the operator can easily pull and remove the engaging piece 22 with the finger. As shown in FIGS. 2 and 3, arcuated projections *24a* are formed on both sides of the engaging groove 24 and notches 26 are formed in the portions of the upper surface of the nozzle cap 18 behind the engaging groove 24. The engaging groove 24 has such a depth that the engaging piece 22 engages the engaging groove 24 at a level lower than the level of the projections *24a*.

The existence of the notches 26 adds an elastic force to the projections *24a* and allows the arcuated projections *24a* to guide the engaging piece 22 so that the engaging piece 22 is received in the engaging groove 24 smoothly. Once received, the engaging piece 22 is pushed by the projections *24a* under the elastic force and is securely engaged with the engaging groove 24. Since the lower surface of the front end of the engaging groove 24 is chamfered, the operator puts the finger in the chamfered portion 28 of the engaging groove 24 and holds the front end of the engaging piece 22 with the finger. As the engaging piece 22 is rotated upward, it can be disengaged from the engaging groove 24 easily.

In order to facilitate engagement and disengagement, a semispherical recess *23a* may be formed on the rear edge of the engaging groove 23, as shown in FIG. 1. The operator may hold the front end of the engaging piece 22 with the finger through the recess 23. The shape of the engaging grooves 23 and 24 are only examples of the present invention. Needless to say, other shapes can be chosen.

The above-mentioned embodiment is only example which explains the present invention and does not limit the scope of the present invention. Needless to say, various modifications and alterations are possible as long as they fall within the scope of the present invention.

As mentioned above, according to the present invention, when there is a nozzle cap 18 at the not using position ("Off" position) at which the orifice 20 is disconnected from the flowing-out passage of the dispenser body 14, the nozzle cap 18 is locked by causing the engaging piece 22 to engage with the engaging groove 24 of the nozzle cap 18. Even if a child touches the dispenser 10, he or she cannot rotate the nozzle cap 18 to the position at which the liquid flows out.

Therefore, even if the child moves the trigger 12, the liquid does not flow out and an trouble caused by unexpected flowing out of the liquid is prevented.

When the engaging piece 22 is engaged with the engaging groove 23 of the dispenser body 14, the nozzle cap 18 can be rotated without being obstructed by the engaging piece 22 and any required liquid flow pattern can be obtained. The engaging piece 22 is not only formed into a too small size but also it is not exposed and does not give any strange impression because it is received in the engaging groove 23 of the dispenser body 14.

What is the claimed is:

1. A manually operated trigger activated dispenser that is provided with a safety mechanism which prevents a pressurized fluid from flowing from an orifice on a front surface of a nozzle, the safety mechanism comprising:

an engaging piece connected to an upper surface of a dispenser body by a hinge, wherein the engaging piece, the dispenser body and the hinge are integrally molded from a plastic material;

a first engaging groove formed in an upper surface of the dispenser body for receiving the engaging piece;

a second engaging groove formed in a nozzle cap, wherein the engaging piece engages with the second engaging groove when the orifice on the front surface of the nozzle is disconnected from a flowing-out passage formed in the dispenser body;

arcuate projections formed on first and second sides of the second engaging groove; and a notch formed on an upper surface of the nozzle cap on at least one of the first and second sides of the second engaging groove behind the respective arcuate projection formed thereon to provide the respective arcuate projection with an elastic force; and the second engaging groove having a depth such that the second engaging groove receives the engaging piece therein under the arcuate projections.

2. A manually operated trigger activated dispenser according to claim 1, wherein a semispherical recess is formed on a rear edge of the first engaging groove.

3. A manually operated trigger activated dispenser according to claim 1, wherein a lower surface of a front end of the second engaging groove is chamfered.

4. A manually operated trigger activated dispenser according to claim 1, wherein a separate notch is formed on the other of the first and second sides of the engaging groove behind the respective arcuate projections formed thereon to provide the respective arcuate projections with an elastic force.

* * * * *